May 10, 1927.

N. C. BRAY 1,628,302

COUPLING SLEEVE FOR DREDGING PIPES

Filed June 13, 1925

Inventor
Norman C. Bray

By Lancaster and A. Cleons
Attorneys

Patented May 10, 1927.

1,628,302

UNITED STATES PATENT OFFICE.

NORMAN C. BRAY, OF PORTLAND, OREGON.

COUPLING SLEEVE FOR DREDGING PIPES.

Application filed June 13, 1925. Serial No. 36,896.

This invention relates to improvements in dredging sleeves particularly well adapted for use as a coupling for the pipe sections of hydraulic dredge pipe lines.

In hydraulic dredging, pipe lines are used, which comprise a plurality of sections flexibly coupled by flexible joints; the pipe sections being carried on floating barges or pontoons. The flexible coupling sleeves heretofore used are of such character that they do not connect the pipe sections at the joint, as they should, and loss of efficiency of operation occurs as a result, as well as excessive wear on the sleeves and pipes at the joint.

It is therefore the primary purpose of this invention to provide a coupling sleeve for the pipe sections of hydraulic dredge pipes, which will completely fill the joint in an efficient manner to prevent the enlarged recess at the joint, and thus doing away with liability of eddies forming in the stream flow, as well as obviating pockets within which sticks and other solid material may lodge.

Other objects and advantages of this invention will be apparent during the course of the following detailed description.

In the accompanying drawing, forming a part of this specification, and wherein similar reference characters designate corresponding parts throughout the several views, Figure 1 is a fragmentary sectional view taken through the adjacent ends of pipe sections, showing the novel joint forming coupling.

Figure 1:
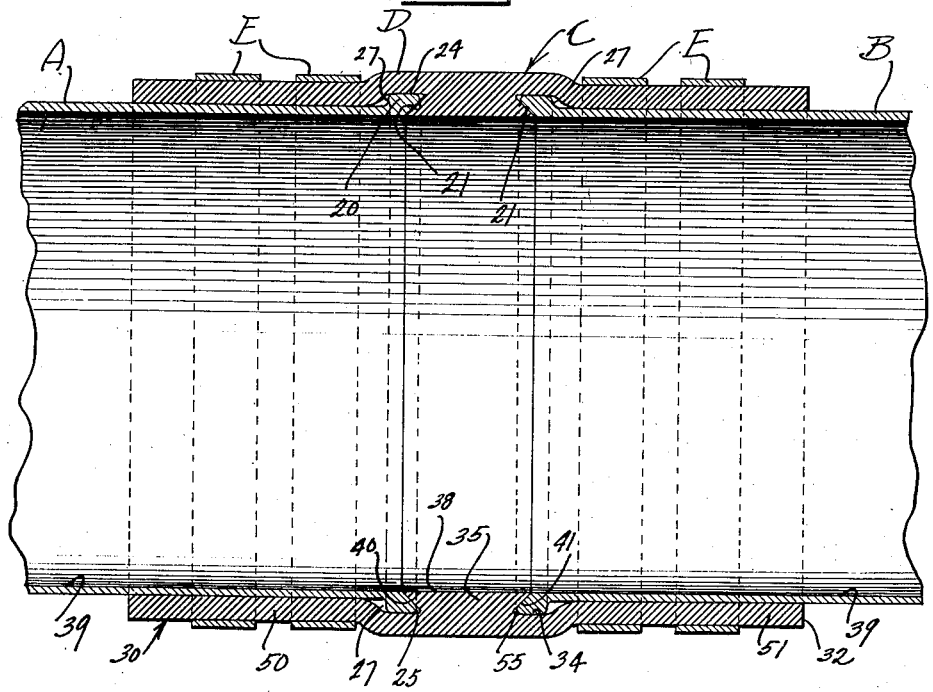
Figure 2:
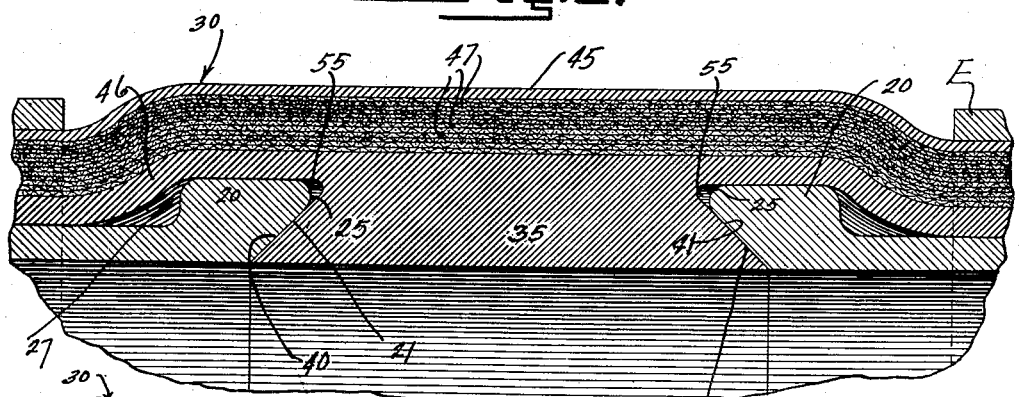
Figure 2 is an enlarged fragmentary sectional view taken through a portion of the preferred structure of the coupling.
Figure 3:
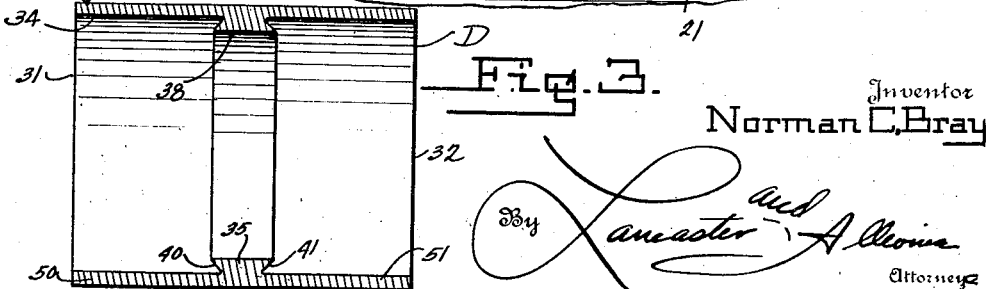
Figure 3 is a reduced longitudinal sectional view taken through the improved coupling sleeve.

In the drawing, wherein for the purpose of illustration is shown only a preferred embodiment of this invention, the letters A and B may generally designate pipe sections, which are adapted to be connected together by means of a coupling structure C consisting of the sleeve D and clamping bands E.

The pipe sections A and B, at the ends thereof are provided with outwardly extending annular flanges 20, and at the marginal edges the pipe sections have a beveled seat 21 sloping from the passageway 39 of the pipe sections to the outer circumference 24 of the flange 20. This provides an outer marginal portion for each pipe section which diminishes in thickness towards the extreme marginal edge 25 of the same. The flange 20 provides an external annular shoulder 27 which cooperates in retaining the coupling at the joint, as will subsequently appear.

In the coupling constructions formerly used, the coupling sleeve was attached at the ends of the pipe sections, with the flanged ends of the pipe sections spaced, and providing a pocket therebetween, which caused the following conditions:—

1. Loss of hydraulic efficiency by reason of enlarging the cross section of the water passageway at the joint so as to cause eddies in the stream flow.

2. Excessive wear upon the sleeves exposed between the facing edges of the pipe sections by reason of sand and gravel constantly eddying in the stream flow at the joints.

3. By reason of stream pressure the flexible coupling sleeve in conventional practice enlarges in the space between the end edges of the pipe sections, further increasing loss in hydraulic efficiency by reason of eddies, and permitting rocks and sticks to lodge in the joint.

Referring to the coupling sleeve D, the same may be of one-piece construction, or special composition. In the main it comprises a cylindrical shaped body 30, providing an internal passageway of sufficient diameter to snugly receive the ends of the pipe sections A and B. About midway between the end edges 31 and 32 of the sleeve body 30, at the inner periphery 34 of said body 30, an integral annular sleeve locking and joint filling band 35 is provided, which is preferably dove-tailed shape in cross section. The band 35 is preferably of uniform thickness at the internal periphery of the sleeve, and projects for this thickness into the sleeve passageway, and provides a constricted passageway 38 therethrough, which is adapted to lie flush with the internal passageway 39 of the pipe sections A and B when in place, and as will subsequently appear. The band 35 dove-tailed as above mentioned, thus provides the beveled or sloping end edges 40 and 41 facing the open ends of the sleeve; these edges 40 and 41 being relatively divergent from the connection of the band with the body 30, toward the passageway 38 thru said band. The body 30 may of course be solid, or it may be of built-up composition. In the preferred instance the body 30 preferably comprises an outer layer 45 or rubber or analogous resilient flexible material, which in the conventional instance is about 1/8" thick. It furthermore includes an inner sleeve or layer of rubber 46, which in conventional practice is from 3/8 to 1/2" thick, and with which the novel joint filling band 35, above mentioned, is integrally formed. Between the sleeve inner and outer portions 45 and 46, a plurality of layers 47 of canvas or analogous fabric are placed, preferably of a weight 30 ounces to the square yard, and between these canvas layers thin films of rubber may be placed to bind the layers together.

As to the coupling of the sleeve D upon the ends of the pipe sections A and B, the ends of the pipe sections A and B are slipped into the passageway of the sleeve body 30, at opposite ends thereof, until the beveled seats 21 at the facing ends of said pipe sections A and B come into engagement with the annular beveled edges 40 and 41 of the coupling sleeve band 35. When in this position the portions 50 and 51 of the body 30, outwardly from the joint filling band 35 are clamped by the clamping bands E upon the body portions of the pipe sections A and B; the bands E being of the well known adjustable clamping construction (not shown) and serving to lock the portions 50 and 51 upon the pipe sections, by reason of the flange 20 on the pipe sections which provides the shoulder 27 to prevent detachment of said pipe sections, and as can readily be understood.

In the position of assemblage above mentioned, the dove-tailed shaped band or filler 38 thus projects into the joint between the ends of the pipe sections A and B, completely filling the same, and so that the inner periphery 38 lies flush with the inner peripheries 39 of the pipe sections A and B. In this relation of parts, it is to be noted that there is an annular pocket 55 at the juncture of the band 35 with its body 30, facing the extreme end edge 25 of each pipe section, and this open pocket 55 for each pipe section A and B, permits the play of the pipe sections A and B, and renders the joint flexible, so that there can be some relative movement between the pipe sections at their ends and the adjacent portions of the coupling sleeve.

From the foregoing it can readily be seen that due to the dove-tailed connection of the band 35 with the ends of the pipe sections A and B, there will be no liability of displacement of the joint filling band 35 from its position between the pipe sections, by reason of outward pressure of the stream flow. Incident to the use of such type of dredge coupling, there are several primary advantages resulting over now known coupling sleeves as follows:—

1. Increased efficiency in hydraulic action since the diameter of the pipe line passageway is uniform from end to end, and is not interrupted or eccentric at the joints.

2. By reason of the uniform passageway eddies are eliminated in the stream flow.

3. By reason of the dove-tail feature of the joint, the sleeve will not enlarge under pressure, and because of the reinforced quality of the sleeve incident to greater thickness greater hydraulic efficiency results at all pressures consistent with dredging practice.

4. The lodging of sticks, rocks, and other foreign materials such as sand, etc., is prevented at the joints by reason of the filling of the same with the band 35 which is a part of the coupling sleeve.

Other advantages, of course, result, and the above have merely been enumerated as primary advantages.

Various changes in the shape, size, and arrangement of parts may be made to the form of invention herein shown and described, without departing from the spirit of the invention or the scope of the claims.

I claim:

1. In a flexible dredging pipe joint the combination of a pair of pipe sections, and a coupling arrangement including a flexible sleeve with a passageway therethrough adapted to receive the ends of said pipe sections, said sleeve internally thereof providing a filler band against which the ends of said pipe sections may abut to fill the space between the ends of said pipe sections, said pipe sections at their ends and filler band being so formed as to provide an expansion and contraction pocket at the juncture of each of said pipe sections with said band.

2. In a coupling the combination with a pair of pipe sections each having the end edge thereof beveled in a sloping relation from the outer surface of the pipe inwardly toward the passageway thru the pipe section, a resilient coupling sleeve having a passageway therein adapted at its opposite ends to receive the adjacent ends of the pipe sections, said sleeve at its ends being expansible, said sleeve, between the ends of the pipes which project into the passageway of the sleeve, having an integral resilient filler band the opposite edges of which are beveled in a divergent relation for abutment with the beveled edges of the adjacent pipe sections, whereby when the pipe sections are in such abutment the filler band has a dove-tailed connection between the facing ends of said pipe sections, the extreme outer edges of said pipe sections terminating short of the juncture of the filler band with the sleeve to provide annular pockets which will permit of expansion and contraction of the parts of the coupling.

3. In a coupling the combination with a pair of pipe sections each having the end edge thereof beveled in a sloping relation from the outer surface of the pipe inwardly toward the passageway thru the pipe section, a resilient coupling sleeve having a passageway therein adapted at its opposite ends to receive the adjacent ends of the pipe sections, said sleeve at its ends being expansible, said sleeve between the ends of the pipes projecting into the passageway of the sleeve having an internal resilient filler band the opposite edges of which are beveled in a divergent relation for abutment with the beveled edges of the adjacent pipe sections, whereby when the pipe sections are in such abutment the filler band has a dove-tailed connection between the facing ends of said pipe sections, the extreme outer edges of said pipe sections terminating short of the juncture of the filler band with the sleeve to provide annular pockets which will permit of expansion and contraction of the parts of the coupling, said pipe sections having annular flanges outwardly extending at the ends thereof forming shoulders facing away from the filler band between the said pipe sections, and annular clamping members holding the ends of said sleeve and the respective sections in a clamped relation at the opposite sides of said flanges and shoulders thereof with respect to the filler band.

NORMAN C. BRAY.